United States Patent [19]

Brickell et al.

[11] Patent Number: 4,628,960

[45] Date of Patent: Dec. 16, 1986

[54] SPRAYER SIGHT GAUGE

[75] Inventors: Joseph W. Brickell, Jonesboro, Ark.; Edward A. Bellandi, San Jose, Calif.

[73] Assignee: FMC Corporation, Chicago, Ill.

[21] Appl. No.: 649,458

[22] Filed: Sep. 10, 1984

[51] Int. Cl.$^4$ .............................................. F16K 37/00
[52] U.S. Cl. ..................................... 137/558; 137/565; 137/559; 137/899.4; 239/74
[58] Field of Search ............ 137/558, 559, 899, 899.4, 137/565; 239/74

[56] References Cited

U.S. PATENT DOCUMENTS

| Re. 15,248 | 12/1921 | Dingle | 239/74 |
|---|---|---|---|
| 983,346 | 2/1911 | Burdick et al. | 239/74 |
| 1,444,016 | 2/1923 | Warthen et al. | 137/559 |
| 2,521,313 | 9/1950 | Sproat | 137/899.4 |
| 3,633,421 | 1/1972 | Phillips | 251/310 |
| 4,193,356 | 3/1980 | Vehe et al. | 239/74 |

FOREIGN PATENT DOCUMENTS 233824  4/1911  Fed. Rep. of Germany ........ 239/74

Primary Examiner—A. Michael Chambers
Attorney, Agent, or Firm—Ronald C. Kamp; Richard B. Megley

[57] ABSTRACT

A sight gauge for a towed sprayer having a channel formed in a shroud, which is inclined more from the vertical in its upper portion, with a plastic tube mounted in the channel. A visual indicator is trapped within the tube to indicate liquid level in the sprayer tank.

6 Claims, 2 Drawing Figures

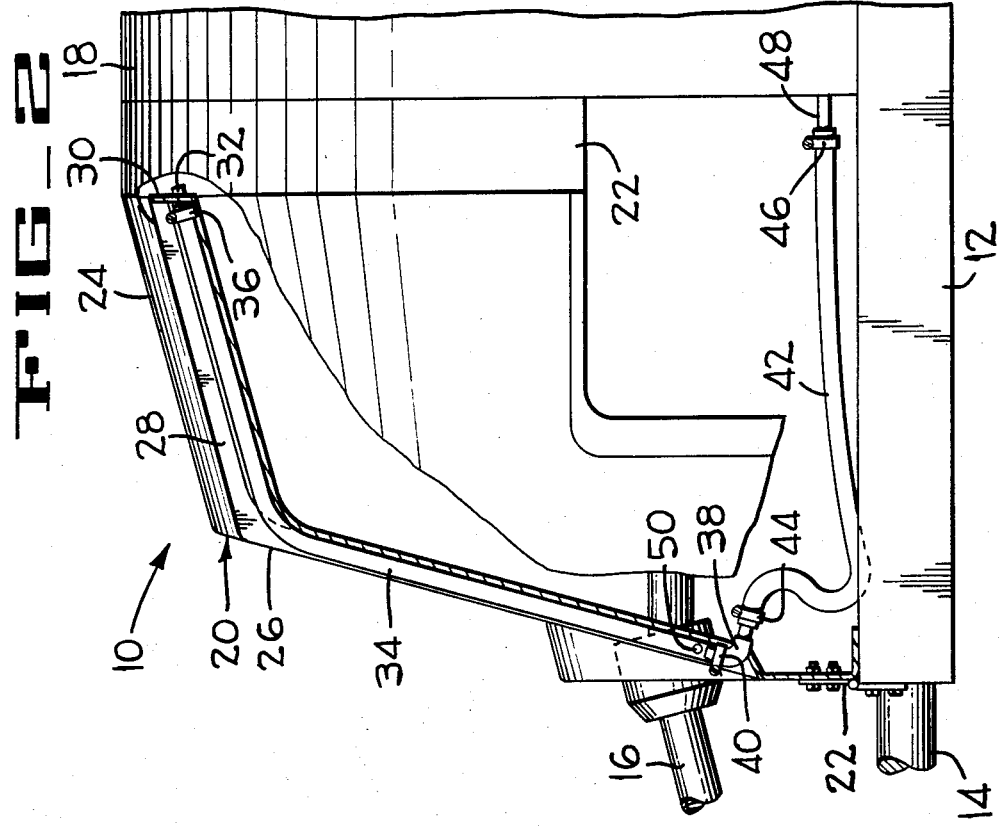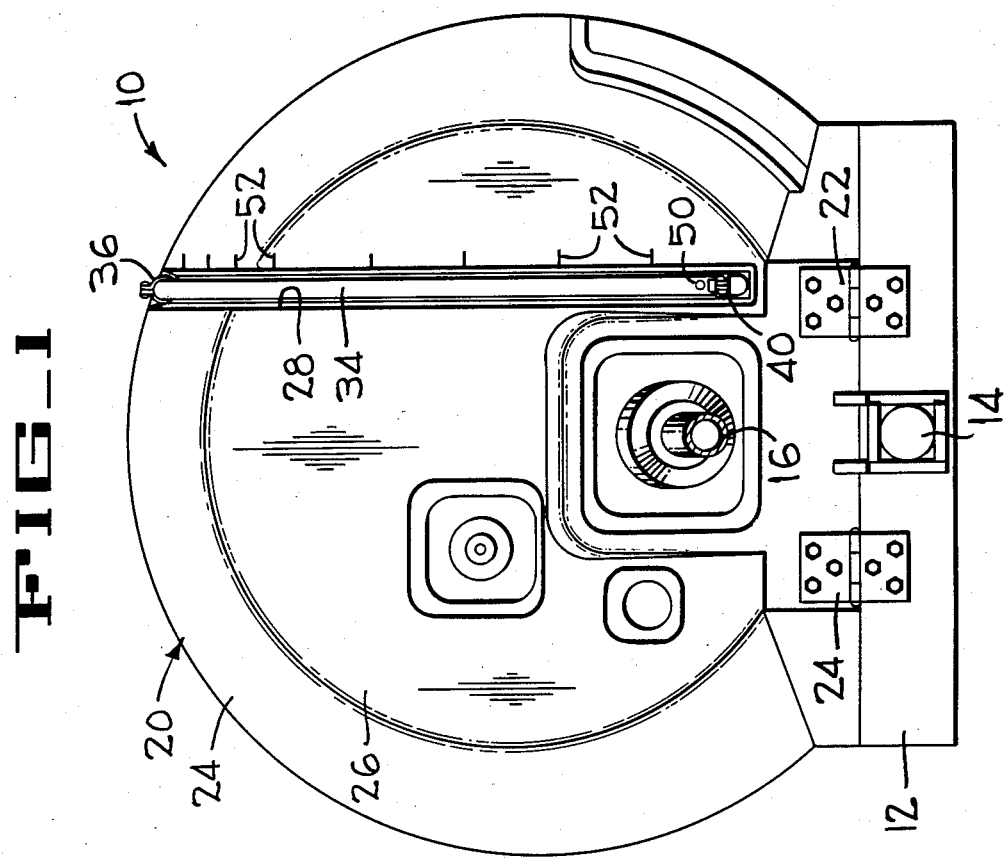

SPRAYER SIGHT GAUGE

This invention relates to sight gauges, i.e. gauges for visually determining the level of a liquid in a tank, and more particularly, to such gauges for use with sprayers.

The present invention provides a sturdy, economical and readily serviceable sight gauge for a sprayer which is compactly incorporated into the forward shroud thereof without appreciably diminishing the capability of the sprayer to transverse a rowed crop of plants, such as found in orchards and vineyards, for example, with minimal damage to the plants and/or the fruit produced thereon. The sight gauge, and the shroud with which it is associated, permits observation from a wide range of positions, including direct observation by an individual filling the sprayer tank with liquid through a conventional lid ring or opening in the top of the tank. The clear, flexible plastic tubing utilized herein allows the sight gauge to follow the vertical contour of a shroud channel positioned to produce a non-linear response gauge. The rate of movement of the gauge indicator buoyed by the liquid inside the tubing increases, at a constant fill rate, as the tank approaches its capacity. The possibility of overflowing the tank is thereby reduced because this fast movement occurs within a critical period near overflow, the occurrence of which is undesirable, particularly when the solution involves insecticides, herbicides and/or fungicides. The sight gauge is also arranged to be easily seen by an operator seated on the tractor towing the sprayer.

These and other attributes and advantages of the present invention will become more readily apparent from a perusal of the following description and the accompanying drawing, wherein;

FIG. 1 is a front elevational view of a sprayer, with conventional and unrelated components eliminated, incorporating the present invention, and FIG. 2 is a side elevational view, partly in section, of the front portion of the sprayer shown in FIG. 1.

Referring now to the drawing, there is shown a sprayer, indicated generally at 10, including a wheel-supported frame 12. A drawbar 14 secured to the frame 12 is detachably connectable to a tractor, not shown, which supplies the force necessary for towing the sprayer 10, in addition to powering the PTO shaft 16, which shaft is operatively connected to drive powered components on the sprayer, such as pumps and blowers. A cylindrical tank, a portion of which is shown at 18 in FIG. 2, is mounted on the frame 12. The tank 18 holds the liquid, usually a water solution of insecticide, herbicide, fungicide or the like, which is applied to plants by the sprayer 10.

A shroud 20 is pivotally attached by a pair of hinges 22 and 24 tothe front end of the frame 12 to permit access to the pump unit, not shown, but conventional mounted on the frame forward of the tank 18, for service thereof. In order to limit the degree of pivoting of the shroud 20, a chain or flexible cable, not shown, of predetermined length may be attached between the shroud and some fixed point relative to the frame. The shroud 20 is preferably formed of fiberglass material and includes a cylindrical rear section 22, a conical section 24 and a rearwardly sloped flat front surface 26. Suitable faired openings may be provided in the sections for service and functional apparatus. The cylindrical section 22 is contiguous with the outer surface of the tank 18. The conical section 24 has an upper chord which makes an angle with horizontal of approximately 15 degrees, while the surface 26 is angled rearward at the top at approximately 15 degrees from vertical. The surface 26 is smoothly faired with the conical section 24. The angled surface 26 and the conical section 24 are therefore oriented to gently deflect limbs or fruit that extend into the path of the sprayer 10 as it is towed through a crop of plants to be sprayed.

A vertical channel 28 is formed in the surface 26 and conical section 24 and extends from near the bottom of the surface 26 to the top of the conical section 24 where the channel terminates in a vertical wall section 30. A fitting 32 is secured in a hole formed in the wall section 30. The fitting 30 is provided with an axial through path for ingress and egress of air to and from a clear plastic tube 34 secured to the fitting 32 by a hose clamp 36. The tube 34 fits into and extends the length of the channel 28 where it is secured to an elbow-type fitting assembly 38 by a hose clamp 40. A second hose 42, which may be of any suitable material, is secured to the fitting assembly 38 by clamp 44 at one end and by clamp 46 at its other end to a pipe 48 secured to and communicating with the tank 18. A shut-off valve, not shown, may be interposed in the pipe 48. The communication so provided with the tank 18 permits the level of the fluid in the clear tube 34 to correspond with the fluid level in the tank 18. Since the tube 34 may become clouded by the materials in solution, a highly visible ball 50 is trapped within the tube 34 between the fitting 32 and 38. The ball 50 must have a diameter smaller than the inside diameter of the tube 34 and must be small enough to freely traverse the bend in the tube 34 as it spans the channel portion in the surface 26 and that portion of the channel in the conical section 24 which causes a slight flattening of the tube. Of course, the ball 50 must be capable of floating on the water surface and immune to the chemicals employed in the solutions. A suitable material for the ball is polypropylene, which has the essential immune properties and enhances is of such density that portion of the ball is beneath the surface of the solution. The water is held by the tube 34 so that it magnifies the submerged portion of the ball and its function as a solution level indicator. For convenience in determining the liquid level, indicia 52 are provided on the surface 26 and the section 24. In order to accommodate the distance changes associated with pivoting the shroud 20 forward, the tube 42 is routed near the axis of hinges 22 and 14 and is provided with an excess length, which is accommodated by permitting it to sag below the upper level of the frame 12 and form opposed radii, when the shroud is pivoted to its rearward position, as shown in FIG. 2.

While a preferred embodiment of the present invention is illustrated and described herein, it will be appreciated that various changes and modifications may be made therein without departing from the spirit of the invention as defined by the scope of the appended claims.

What is claimed is:

1. A sight gauge for use with a sprayer having a tank comprising:
   a shroud covering the forward end of said tank and formed complementary to and contiguous with said tank;
   said shroud having a rearwardly angled flat front surface and an upper adjoining conical section;
   a continuous vertical channel formed in said surface and said section;
   a clear plastic tube secured in said channel;

said channel having a depth at least equal to the outer diameter of said tube;

a flotable indicator freely moveable within said tube; and means communicating the lower end of said tube with said tank.

2. The invention according to claim 1, wherein said indicator comprises:

a ball having a diameter less than the inner diameter of said tube and having a density less than water trapped within said tube.

3. The invention according to claim 2 wherein said ball is composed of polypropylene.

4. In a sprayer having a liquid-holding tank mounted on a frame and a shroud hinged to said frame and contiguous with said tank, the improvement comprising:

a channel formed in the front of said shroud with an upper portion being inclined and angled more from vertical than the lower portion;

a clear plastic tube secured in said channel;

said channel having a depth at least equal to the outer diameter of said tube;

a floatable indicator freely moveable within said tube; and means communicating the lower end of said tube with said tank.

5. The invention according to claim 4, wherein said indicator comprises:

a ball having a diameter less than the inner diameter of said tube trapped within said tube.

6. The invention according to claim 5 wherein said ball is composed of polypropylene.

* * * * *